(No Model.) 2 Sheets—Sheet 1.

J. P. LAVIGNE.
BICYCLE PEDAL.

No. 601,518. Patented Mar. 29, 1898.

Witnesses. Joseph P. Lavigne. Inventor.

(No Model.) 2 Sheets—Sheet 2.

J. P. LAVIGNE.
BICYCLE PEDAL.

No. 601,518. Patented Mar. 29, 1898.

UNITED STATES PATENT OFFICE.

JOSEPH P. LAVIGNE, OF NEW HAVEN, CONNECTICUT, ASSIGNOR OF ONE-HALF TO WILBUR F. DAY, OF SAME PLACE.

BICYCLE-PEDAL.

SPECIFICATION forming part of Letters Patent No. 601,518, dated March 29, 1898.

Application filed August 5, 1896. Serial No. 601,799. (No model.)

*To all whom it may concern:*

Be it known that I, JOSEPH P. LAVIGNE, of New Haven, in the county of New Haven and State of Connecticut, have invented a new Improvement in Bicycle-Pedals; and I do hereby declare the following, when taken in connection with the accompanying drawings and the letters of reference marked thereon, to be a full, clear, and exact description of the same, and which said drawings constitute part of this specification, and represent, in—

Figure 1:
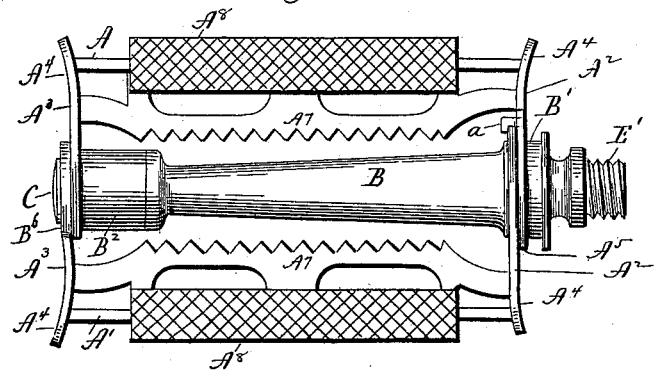
Figure 2:
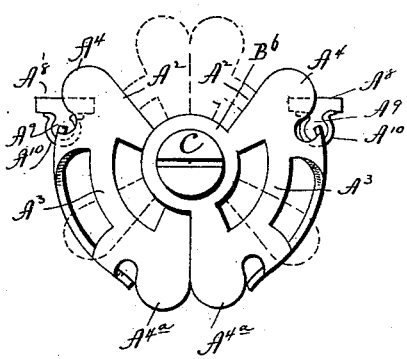
Figure 3:
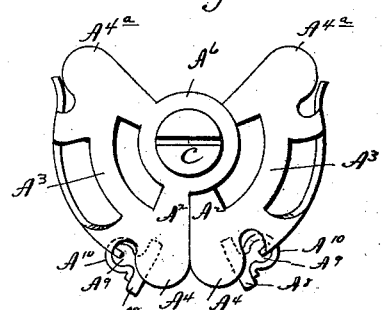
Figure 4:
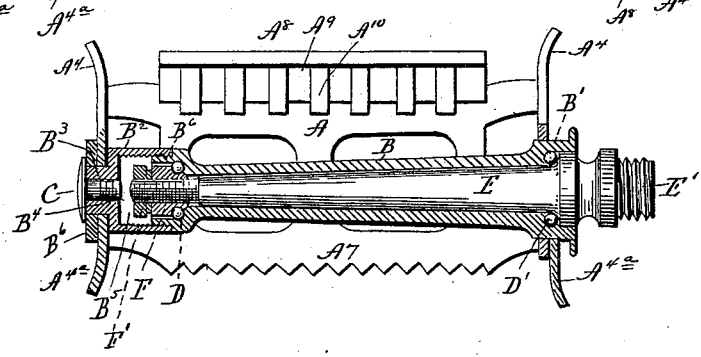
Figure 5:
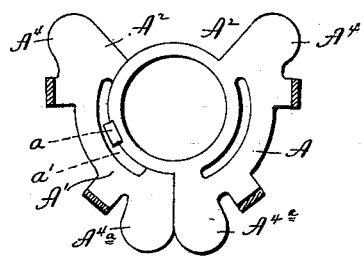
Figure 6:
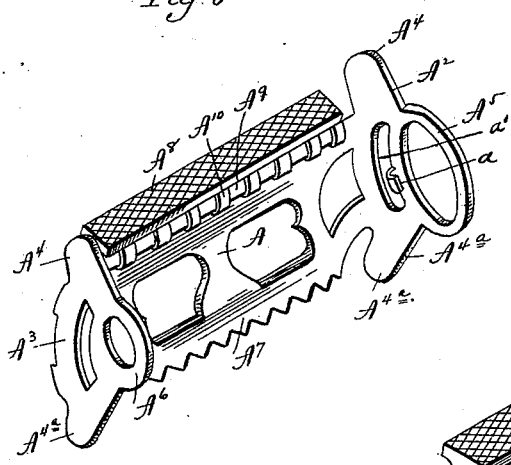
Figure 7:
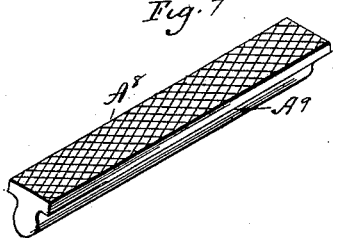

Figure 1, a plan view of a pedal constructed in accordance with my invention; Fig. 2, a view thereof in end elevation, showing its conversion for use as a rubber-bar pedal; Fig. 3, a similar view showing the conversion of the pedal for use as a rat-trap pedal; Fig. 4, a view of the pedal in vertical longitudinal section, showing it as converted for use as a rubber-bar pedal; Fig. 5, a detached view, partly in end elevation and partly in section, showing the inner ends of the two frame-plates, with particular reference to their being coupled together by a coupling-hook formed upon one of them; Fig. 6, a detached perspective view of one of the frame-plates; Fig. 7, a detached perspective view of one of the rubber bars.

My invention relates to an improvement in balanced bicycle-pedals, or, in other words, to bicycle-pedals which are constructed so that the center of gravity in them will be below the pedal-pin, whereby the pedal-frame will be maintained in position for engagement by the foot by the action of gravity.

The object of my present invention is to produce a simple, compact, strong, durable, and effective convertible combined rat-trap and rubber-bar pedal of the type described, the said pedal to be constructed with particular reference to convenience of conversion and simplicity and fewness of parts.

With these ends in view my invention consists in a pedal having certain details of construction and combinations of parts, as will be hereinafter described, and pointed out in the claims.

In carrying out my invention I employ two skeleton sheet-metal frame-plates A and A', each formed from a single piece of sheet metal and corresponding to each other. These plates are turned inward at a right angle at each end to form inner arms $A^2$ and outer arms $A^3$, each of the said arms having two oppositely-projecting outwardly-turned stop-ears $A^4$ $A^{4a}$, forming fenders for preventing the foot from being laterally displaced upon the pedal. The inner arm $A^2$ of each frame-plate is constructed with a bearing-ring $A^5$, while the outer arm $A^3$ of each plate is constructed with a bearing-ring $A^6$ of smaller diameter than the ring $A^5$. The said bearing-rings of the respective plates overlap each other, as clearly shown in Fig. 1. One edge of each plate is constructed with a series of teeth $A^7$, forming the foothold characteristic of rat-trap pedals, while the opposite edge of the plate is provided with a rubber bar $A^8$, forming the foothold characteristic of rubber-bar pedals, the said bar $A^8$ being constructed, as shown, with a stem-shaped rib $A^9$, which is inserted between a series of oppositely-projecting bowed retaining-fingers $A^{10}$, formed integral with that edge of the plate opposite from the toothed edge thereof. In cross-section the plate is slightly bowed and in end elevation it is seen to be sector-shaped in its general form, sector shape being given to the plate by the extension of the stop-ears $A^4$ $A^{4a}$ of its inner and outer arms beyond its footholds, which are formed by the teeth $A^7$ and the rubber bar $A^8$, respectively.

By making the plates in the form described the footholds are brought to rest in a horizontal plane above the plane of the spindle in either position of the plates. Furthermore, by making the plates of the form described the pedal is made very compact in form and attractive in appearance, for when the edges of the plates which are uppermost are spread apart the edges of the plates which are lowermost are brought together, as clearly shown in Figs. 2 and 3 of the drawings. In other words, when the upper portion of the pedal is open the lower portion is closed, whereby compactness is not only secured, but also peculiar attractiveness of form. While I have described the plates as being sector-shaped in general form, their arms might be called "butterfly-arms" from the appearance they present in end elevation.

The two plates are mounted upon the hub B, so as to turn thereupon as upon a swivel, the inner end of the hub being furnished with a bearing B', receiving the bearing-rings $A^5 A^5$ of the plates, while the outer end of the hub is furnished with a removable cap $B^2$, provided with an outwardly-projecting bearing $B^3$, receiving the bearing-rings $A^6 A^6$ of the respective plates. The said plates are held in place against endwise displacement by means of a screw C, the stem of which plugs a longitudinal opening $B^4$, leading into an oil-chamber $B^5$, formed by the cap. The head of the said screw C is larger in diameter than the diameter of the bearing $B^3$, and therefore overhangs the outer bearing-rings $A^6$, as shown in Fig. 4, in such a manner as to hold the two swiveled frame-plates in place and against outward endwise displacement. By removing the screw a passage is provided for the injection of oil into the chamber $B^5$. Then when the screw is replaced the chamber is effectually closed and dust kept out of the oil, which lubricates the two series of ball-bearings D and D', interposed between the hub B and the pedal-pin E, the inner end of which is provided with the usual threaded stem E', whereby the pedal is secured to the crank-arm of the bicycle. The cap $B^2$ aforesaid is internally threaded to provide for its application to an externally-threaded shoulder $B^6$, formed at the extreme outer end of the hub B, as shown. The outer end of the pedal-pin E is threaded for the application of a ball-bearing cone F, which is secured in place by means of a nut F', the same being located within the oil-chamber $A^5$, the oil in which works its way inward into the bearings of the pedal.

For coupling the arms $A^2 A^2$ of the respective plates A and A' together I furnish the plate A with a hook $a$, projecting inward from its ring $A^5$ and passing through a segmental slot $a'$, formed in the plate A', as clearly shown in Fig. 5. The two frame-plates A and A' are mounted upon the hub B and its cap $B^2$, so as to swivel thereupon, as before stated. Although the inwardly-turned arms at the ends of the plates are not located in the same vertical plane their stop-ears $A^4$ and $A^{4a}$ are bent outward, so as to engage with each other, as very clearly shown in Figs. 2, 3, and 5. The turning of the plates upon their bearings shifts the center of gravity in the pedal, so that it balances for use as a rat-trap pedal or as a rubber-bar pedal, as desired. Thus when the frame-plates are turned so as to separate their stop-ears $A^4 A^4$ and bring their stop-ears $A^{4a} A^{4a}$ into contact, as shown in Fig. 2, the center of gravity of the pedal will lie below the pedal-pin E and the pedal will be balanced with its rubber bars $A^8$ uppermost, as shown in the said figure. The pedal as thus adjusted normally presents the rubber bars to the action of the foot and has all the attributes of a first-class rubber-bar pedal. On the other hand, when the respective frame-plates are turned so as to separate the ears $A^{4a} A^{4a}$ and bring the ears $A^4 A^4$ into engagement, as shown in Fig. 3, the center of gravity in the pedal will be shifted and the pedal will be balanced, with the serrated edges $A^7$ of the plates uppermost, so that the pedal will have all of the attributes of an ordinary rat-trap pedal, the rubber bars $A^8 A^8$ being virtually retired. The movement of the plates for converting the pedal from a rubber-bar pedal to a rat-trap pedal, or vice versa, is very easily effected by the fingers. My improved pedal has also the merit of extreme lightness and durability and, as before mentioned, provides for carrying oil and excluding dust therefrom.

It is apparent that in carrying out my invention some changes from the construction herein shown and described may be resorted to, and I would therefore have it understood that I do not limit myself to such form, but hold myself at liberty to make such variations therefrom as fairly fall within the spirit and scope of my invention.

I am aware, however, that balanced pedals are old and also that it is old to combine in one pedal both rat-trap and rubber-bar footholds, and I do not claim either of those constructions broadly, nor do I broadly claim pedals having bent sheet-metal frame-plates.

Having fully described my invention, what I claim as new, and desire to secure by Letters Patent, is—

1. In a convertible balanced pedal, the combination with a pedal-pin, of a hub mounted thereupon, and two frame-plates each formed from a single piece of sheet metal, each having its respective edges adapted to furnish footholds, and each having its respective ends turned inward at a right angle to form an inner arm and an outer arm each of which comprises a bearing-ring and two outwardly-projecting stop-ears, the two plates being swiveled by their said bearing-rings upon the hub on which they are rotated for shifting the center of gravity in the pedal, and the stop-ears forming fenders for the feet, and those of one plate engaging with those of the other plate to limit the turning of the plates on the hub, whereby when the ears are engaged with each other the then upper edges of the plates will be substantially in their right relative positions.

2. In a convertible balanced pedal, the combination with a pedal-pin, of a hub mounted thereupon, and two sheet-metal frame-plates, each formed from a single piece of sheet metal, each having its respective edges adapted to furnish footholds, and each having its ends turned inward at a right angle to form an inner arm and an outer arm each of which comprises a bearing-ring and two outwardly-projecting stop-ears which extend beyond the footholds, the bearing-rings of the respective arms being lapped over each other and the arms and plates being formed with segmental slots and with hooks entering the same, whereby the overlapping arms of the respective plates are coupled together without preventing the independent swiveling movement of the plates which is limited by the engagement of the stop-ears of one plate with the stop-ears of the other plate.

3. In a pedal, the combination with the pin and hub thereof, of frame-plates mounted upon the hub, a cap containing an oil-chamber attached to the outer end of the hub, and provided with a bearing for the outer ends of the frame-plates, and a screw entering the said bearing, engaging with the said plates for securing them in place, and forming a plug for an oil-passage leading into the oil-chamber of the cap.

In testimony whereof I have signed this specification in the presence of two subscribing witnesses.

JOSEPH P. LAVIGNE.

Witnesses:
FRED. C. EARLE,
GEORGE D. SEYMOUR.